(12) United States Patent
Kikuchi (10) Patent No.: US 8,740,564 B2
(45) Date of Patent: Jun. 3, 2014

(54) VERTICAL AXIS WIND TURBINE GENERATOR

(76) Inventor: Naomi Kikuchi, Niigata (JP)

( * ) Notice: Subject to any disclaimer, the term of this patent is extended or adjusted under 35 U.S.C. 154(b) by 362 days.

(21) Appl. No.: 13/218,574

(22) Filed: Aug. 26, 2011

(65) Prior Publication Data

US 2012/0049534 A1     Mar. 1, 2012

(30) Foreign Application Priority Data

Aug. 27, 2010 (JP) .................................. 2010-191446
Jul. 29, 2011 (JP) .................................. 2011-167721

(51) Int. Cl.
*F03D 3/06* (2006.01)

(52) U.S. Cl.
USPC .......................... 416/119; 416/132 B; 415/4.2

(58) Field of Classification Search
USPC .............. 415/4.2, 4.4, 907; 416/9, 17, 41, 98, 416/117, 119, 135, 132 B, 140, 142, 197 A
See application file for complete search history.

(56) References Cited

U.S. PATENT DOCUMENTS

| | | | | |
|---|---|---|---|---|
| 4,236,504 A | * | 12/1980 | Cornelison, Jr. | 126/247 |
| 5,616,963 A | | 4/1997 | Kikuchi | |
| 5,808,369 A | * | 9/1998 | Whelan | 290/55 |
| 5,844,323 A | * | 12/1998 | Hung | 290/54 |

FOREIGN PATENT DOCUMENTS

| | | |
|---|---|---|
| JP | 08-128385 A | 5/1996 |
| JP | 2006063932 A | 3/2006 |
| JP | 2010025095 A | 2/2010 |

\* cited by examiner

*Primary Examiner* — Richard Edgar
(74) *Attorney, Agent, or Firm* — Fox Rothschild, LLP; Robert J. Sacco (57) ABSTRACT

A vertical axis wind turbine generator whose blade is allowed to stably operate according to a win force, with a simple structure. The generator is equipped with an arm whose proximal end is coupled to a rotating shaft and whose front edge is provided laterally to a rotating central axis line, and a blade mounted on the arm. A pair of divided blade plates is arranged in a V-shaped form. One sides of the blades are pivotally coupled together, while the opposite sides are provided in openable and closable manner. Coil springs are interposed between the blade plates and the arm. The blade plates are allowed to open or close according to wind directions and wind pressures, so that the rotation speed is regulated with a simple structure, enabling stable electric power generation.

6 Claims, 13 Drawing Sheets

VERTICAL AXIS WIND TURBINE GENERATOR

CROSS REFERENCE TO RELATED APPLICATIONS

This application claims the benefit of Japanese Patent Application No. 2010-191446, filed Aug. 27, 2010, and Japanese Patent Application No. 2011-167721, filed Jul. 29, 2011, both of which are herein incorporated by reference in their entireties.

BACKGROUND OF THE INVENTION

1. Field of the Invention

The present invention relates to a vertical axis wind turbine generator.

2. Description of the Related Art

Figure 14:
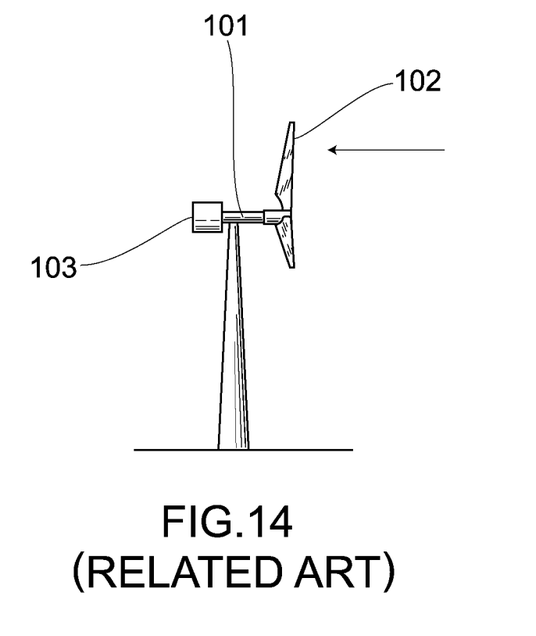
FIG. 14 is a front view illustrating a wind turbine generator according to a conventional art.
Figure 15:
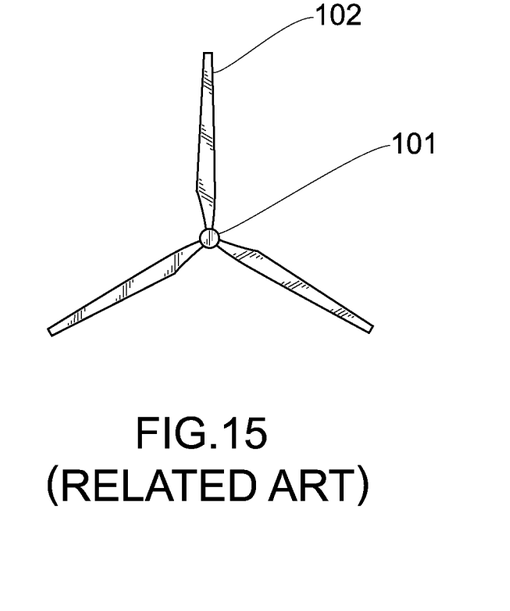
FIG. 15 is a side view illustrating a main part of the wind turbine generator according to a conventional art.

Heretofore, there has been known a horizontal axis wind turbine generator, as shown in FIG. 14 and FIG. 15. In this horizontal axis wind turbine generator employing the conventional technique, a blade 102 is provided on the windward side of a rotating shaft 101 horizontally arranged, while a generator 103 is provided on the leeward side of the rotating shaft 101.

As this kind of horizontal axis wind turbine generator, there is publicly known a wind power generator in which a horizontal axis wind turbine generator is equipped with a generator main body, a power transmission shaft which is rotatably and horizontally supported and transmits a rotary motion to the generator main body, a plurality of spokes radially provided on the power transmission shaft, and blades supported by these spokes. Then, a plurality of protruding pieces provided in the spokes and the blades are coupled by a coupling shaft parallel to these spokes. Each of the blades freely sways around the coupling shaft between an angle made by allowing one end of each blade on a side of the coupling shaft to abut against the spoke for the blade to become oblique to a plane orthogonal to the power transmission shaft and an angle made by allowing each blade to become substantially perpendicular to this plane. Besides, this horizontal axis wind turbine generator includes a spring which is wound around the coupling shaft and is sandwiched in a compressed state so as to energize the blade in its closing direction between the spoke and the blade, as disclosed in, e.g., Japanese unexamined patent application publication No. H8-128385.

The horizontal axis wind turbine generator according to the foregoing conventional technique is designed so that its rotating shaft is parallel to a wind direction, and thus this type has to continue to be kept parallel to a wind direction generally fluctuating, thus requiring an orientation control mechanism.

In regard to this problem, the vertical axis wind turbine generator whose rotating shaft is perpendicular to a wind direction is usually installed so that its rotating shaft becomes perpendicular to the ground surface, and therefore wind always blows perpendicularly to the rotating shaft, leading to the advantage of requiring no orientation control.

Even in the vertical axis wind turbine generator, however, its blade operation must be stabilized, corresponding to a wind power in the same manner as in the horizontal axis wind turbine generator.

Conventionally, however, there has been no vertical axis wind turbine generator capable of stabilizing the behavior of its own blade according to a wind power, using a simple structure.

SUMMARY OF THE INVENTION

With the view of the foregoing problem to be solved, it is an object of the present invention to make it possible to stabilize the behavior of a blade according to wind power with simple structure in a vertical axis wind turbine generator provided with a blade so that a rotating shaft becomes perpendicular to a wind direction.

A first aspect of the present invention is a vertical axis wind turbine generator including a rotating shaft whose rotating central axis line is vertically directed, a blade provided substantially in parallel to the direction of the rotating central axis line, and a generator rotating in conjunction with the rotating shaft. In the blade, a blade plate is arranged substantially in a V-shape in planar view in an openable and closable manner and a spring is provided in the blade plate.

A second aspect of the present invention is a vertical axis wind turbine generator in which the blade plate is formed from a spring plate material.

According to the first aspect of the present invention, an opened or closed state of the blade plate subjected to wind pressure can be regulated by the elastic force of the spring. Hence, the behavior of the blade can be stabilized according to a wind force with a simple structure.

According to the second aspect of the present invention, the blade plate is formed from the spring plate material and hence can easily deform according to a wind direction.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE INVENTION

Hereunder is a description of preferred embodiments according to the present invention with reference to accompanying drawings. In addition, the embodiments described below do not limit the essence of the present invention described in claims. Besides, by no means all the schemes described below are the requirement of the present invention.

Figure 1:
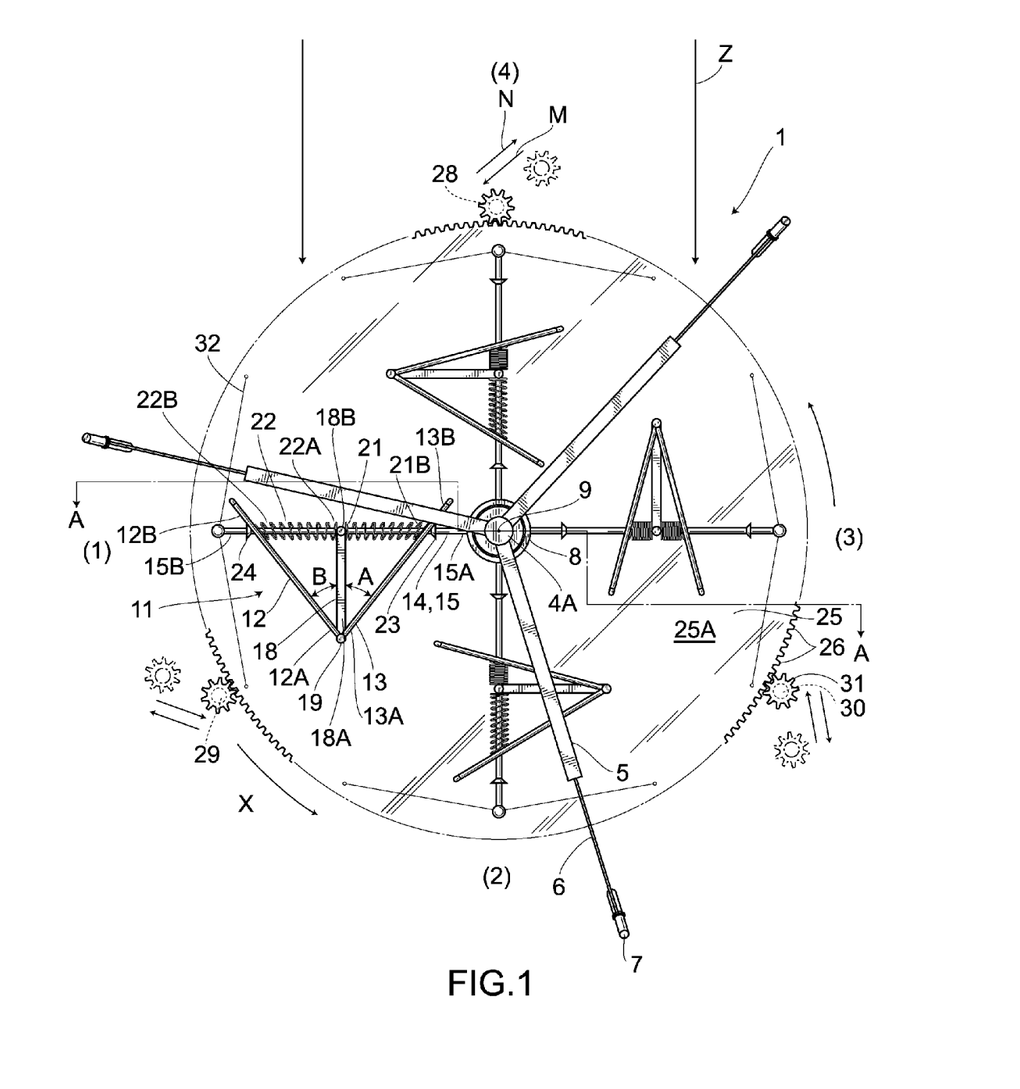
FIG. 1 is a plan view of a vertical axis wind turbine generator illustrating an embodiment 1 of the present invention.
Figure 2:
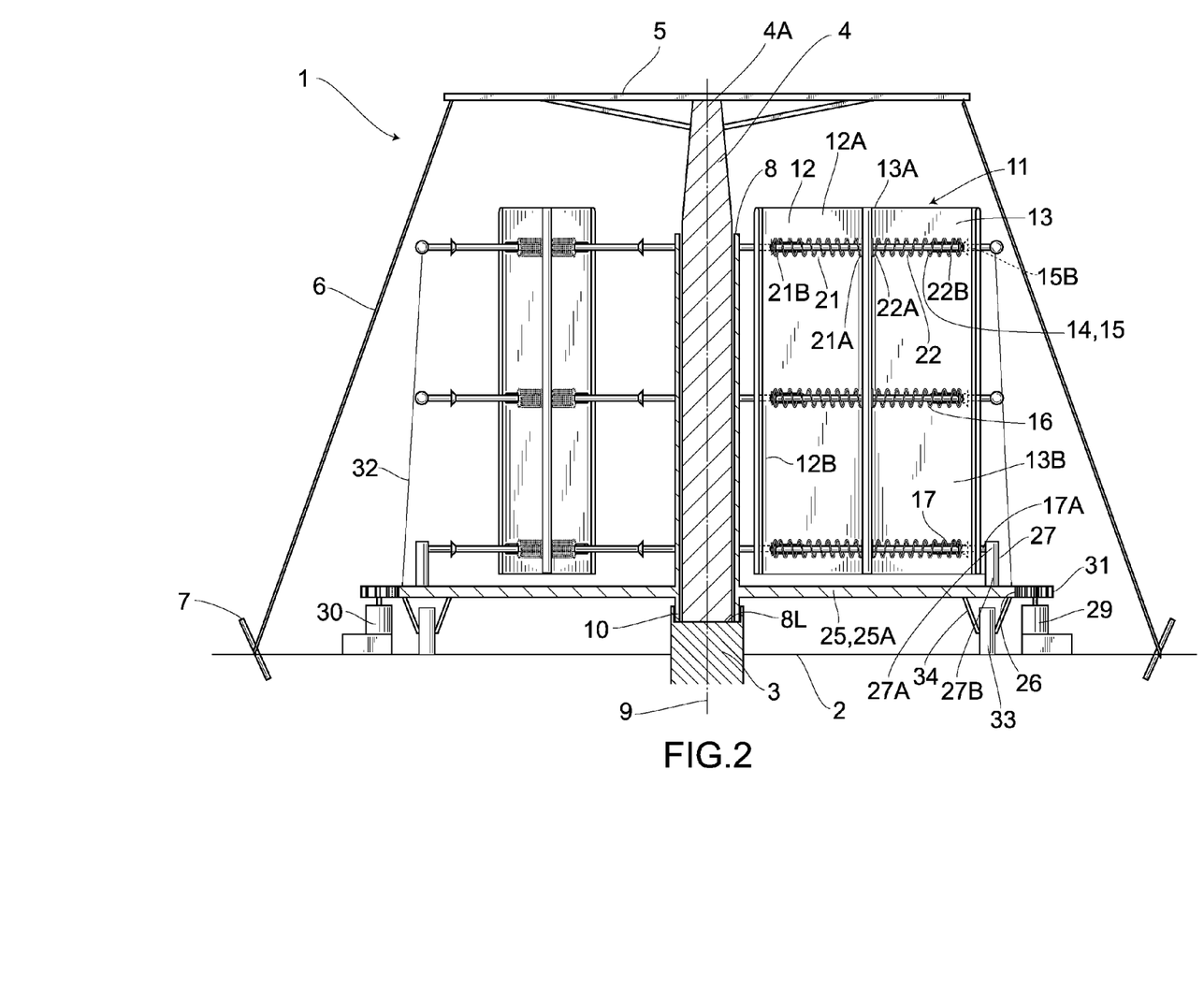
FIG. 2 is a cross-sectional view on an A-A line in FIG. 1 illustrating the vertical axis wind turbine generator illustrating the embodiment 1 of the present invention.
Figure 3:
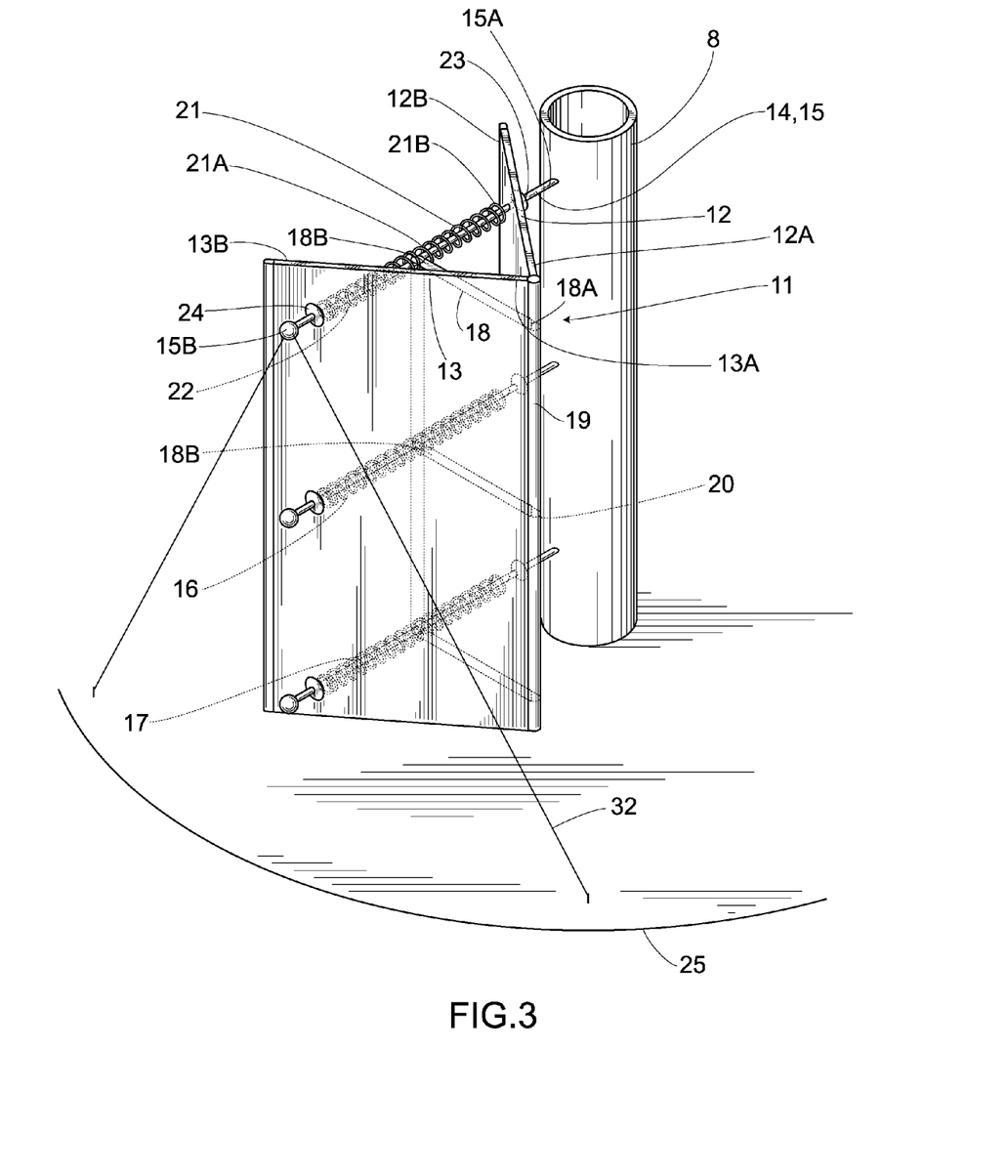
FIG. 3 is a perspective view of a main part of the vertical axis wind turbine generator illustrating the embodiment 1 of the present invention.

FIGS. 1 to 7 show the embodiment 1. FIGS. 1 to 3 show a vertical axis wind turbine generator, while FIGS. 8 to 11 show a horizontal axis wind turbine generator 2 juxtaposed to the vertical axis wind turbine generator 1.

Now, a description is given to the vertical axis wind turbine generator 1. A columnar first windmill support post 4 is fixed in a standing manner on a foundation concrete 3 arranged on the ground. On the upper end of the first windmill support post 4, supporting members 5 such as a steel construction one comprising steel beams are provided at regular intervals radially in three directions. One end of a wire rope 6 is coupled to the leading end of the supporting member 5, while the other end of the wire rope 6 is coupled to an earth's surface fixing member 7 such as a pile, and then the fixing member 7 is fixed to the ground to thereby support the upper end 4A side of the windmill support post 4, preventing the first windmill support post 4 from falling.

There is provided a cylindrical first rotating shaft 8, made up of a pipe or the like, into which the first windmill support post 4 can be loosely fitted. A first rotating central axis line 9 of the first rotating shaft 8 is arranged coaxially with the first windmill support post 4 in a vertically elongated manner. The first rotating shaft 8 is provided rotatably in relation to the foundation concrete 3 and the first windmill support post 4. In addition, a pool 10 for storing a lubricating oil is provided concavely on the upper surface of the foundation concrete 3 serving as a position for pivotally supporting the lower end face 8L of the first rotating shaft 8.

A first blade 11 provided in the first rotating shaft 8 is equipped with a right-and-left pair of first and second divided blade plates 12, 13 serving as a blade plate so that the surfaces of the plates form an substantially V-shape (including an inverted-V-shape) to make an angle in plane. Further, the longitudinal directions of the right-and-left pair of first and second divided blade plates 12, 13 are provided vertically long substantially in parallel to the first rotating central axis line 9. The surfaces of the divided blade plates 12, 13 are covered with fabric, a sheet or a plate made of metal or plastic. This first blade 11 is integrated with the first rotating shaft 8. Then, a first arm 14 is radially fixed to the periphery of the first rotating shaft 8 so as to become orthogonal to the first rotating central axis line 9, and is mounted with the first blade 11. In the present embodiment, four first arms 14 are provided in a radially protruding manner at regular intervals in four directions in relation to the first rotating shaft 8. These four first arms 14 each comprise a first upper arm 15, a first intermediary arm 16, and a first lower arm 17 at intervals at the upper, middle and lower positions, respectively.

Besides, at an substantially central portion in the longitudinal direction of the first upper arm 15, an upper support member 18 for supporting the front edge of the first blade 11 is provided toward one rotating direction X of the first rotating shaft 8, specifically, a direction X in which the first upper arm 15 rotates horizontally with the first rotating axis line 9 centered. The upper support member 18 is linearly provided orthogonally to the first upper arm 15 to allow the front edge 18A of the upper support member 18 to protrude and its proximal portion 18B is fixed. The front edges 12A, 13A of upper portions of the right-and-left pair of the first and second divided blade plates 12, 13 are pivotally coupled to the front edge 18A of the upper support member 18 via a turnable coupling means 19, being a turnable metallic implement such as a hinge. As a result, with the front edges 12A, 13A centered, the proximal ends 12B, 13B opposite to the front edges 12A, 13A can open and close. In addition, a reinforcing support post 20 serving as a reinforcing structural member is integrated with the first and second divided blade plates 12, 13 in the proximal ends 12B, 13B opposed to the front edges 12A, 13A in the right-and-left pair of the first and second divided blade plates 12, 13.

Further, the upper proximal ends opposed to the upper front edges of the right-and-left pair of the first and second divided blade plates 12, 13 are arranged in the other rotating direction with respect to the first upper arm 14. Therefore, upper penetrated portions are provided in the intermediary portions between the front edges and the proximal ends in the upper portions of the right-and-left pair of the first and second divided blade plates 12, 13. Then, the first upper arm 15 penetrates the upper penetrated portions and thereby in the right-and-left pair of the first and second divided blade plates 12, 13, the right-and-left pair of the proximal portions can open and close with the front edges, defined as a turning center, of the right-and-left pair of the first and second divided blade plates 12, 13.

Furthermore, between one divided blade plate 12 among the right pair of the first and second divided blade plates 12, 13 and the first upper arm 15, there is provided a first coil spring 21 serving as a spring for acting as one angle regulating means. Between the proximal portion 18B of the upper support member 18 in the first upper arm 15 and the one divided blade plate 12, this first coil spring 21 is wound around the first upper arm 15. One end 21A of the first coil spring 21 is coupled to the proximal end 18B of the upper support member 18, while the other end 21B thereof is coupled to the one divided blade plate 12. Similarly, between the other divided blade plate 13 among the right-and-left pair of the first and second divided blade plates 12, 13 and a first upper arm 14, there is provided a second coil spring 22 serving as a spring for acting as the other angle regulating means. Between the proximal portion 18B of the upper support member 18 in the first upper arm 15 and the other divided blade plate 13, this second coil spring 22 is wound around the first upper arm 15. One end 22A of the second coil spring 22 is coupled to the proximal end 18B of the upper support member 18, while the other end 22B thereof is coupled to the one divided blade plate 13. In addition, in the proximal end 15A positioned on the side of the first rotating shaft 8 and the front edge 15B opposite to the proximal end 15A, there are provided stoppers 23, 24 for preventing the right-and-left pair of the first and second divided blade plates 12, 13 from excessively opening. When opening beyond a certain angle, the divided blade plates 12, 13 are locked by the stoppers 23, 24 to be prevented from opening further.

The first middle arm 16 and the first lower arm 17 are structured in the same way, thus omitting the detailed description thereof.

A speed increasing disc gear 25 is integrated with the rotating shaft 8 rather below the first lower arm 17 of the first rotating shaft 8. In the speed increasing gear 25, a disc section 25A is horizontally provided coaxially with the first rotating central axis line 9, and teeth 26 are juxtaposed with each other along the peripheral surface of the disc section 25. Further, in the first lower arm 17, there is provided a coupling member 27 whose one end 27A is fixed to the front edge 17A and whose other end 27B is fixed to the disc section 25A.

Then, there are provided first to third generators 28, 29, 30 operating in conjunction with the rotary motion of the rotating shaft 8. Specifically, the first to third generators 28, 29, 30 are provided at intervals outside the speed increasing gears 25 with the first rotating central axis line 9 centered. A driven gear 31 is provided on a rotating shaft of each of the generators 28, 29, 30. Then, the driven gear 31 is provided so as to engage with the teeth 26 of the speed increasing disc gear 25. In addition, in order that the speed increasing gear 25 and the driven gear 31 are allowed to engage with or disengage from each other, the driven gear 31 is allowed to be capable of proceeding to or receding from the first rotating central axis line 9. Then, the moving direction of the driven gear 31 for engaging with the speed increasing gear 25 is not radial with the first rotating central axis line 9 centered but is allowed to move along one rotating direction X of the disc section 25A as shown by the arrowed line M. Thus, the driven gear 31 can engage with the speed increasing disc gear 25. Conversely, for the disengagement therefrom, the driven gear 31 recedes in one rotating direction X as shown by the arrowed line N.

The engagement and the disengagement between the speed increasing disc gear 25 and the driven gear 31 in each of the generators 28, 29, 30 are allowed to be capable of operating simultaneously or separately by means of a controller (not shown) equipped with a computer (not shown).

In addition, numeral symbol 32 in FIG. 1 denotes a wire rope for supporting the upper arm 15 whose one end and other end are connected to the front edge 15B of the upper arm 15 and the disc section 25A, respectively. Further, numeral symbol 33 denotes a rotary supporting member such as a wheel or a roller mounted on the underside of the speed increasing disc gear 25. This rotary supporting member is provided pivotally via a supporting member 34 such as a caster and can roll on the earth's surface, permitting the speed increasing disc gear 25 to be supported.

Figure 4:
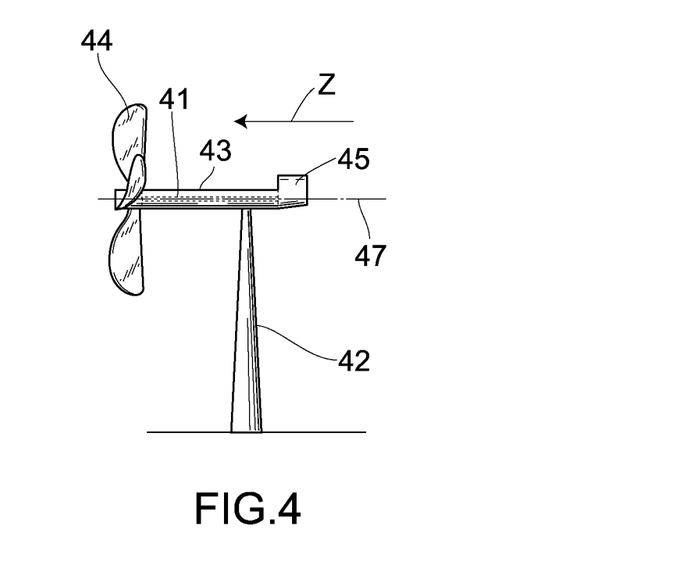
FIG. 4 is a front view of a horizontal axis wind turbine generator illustrating the embodiment 1 of the present invention.
Figure 5:
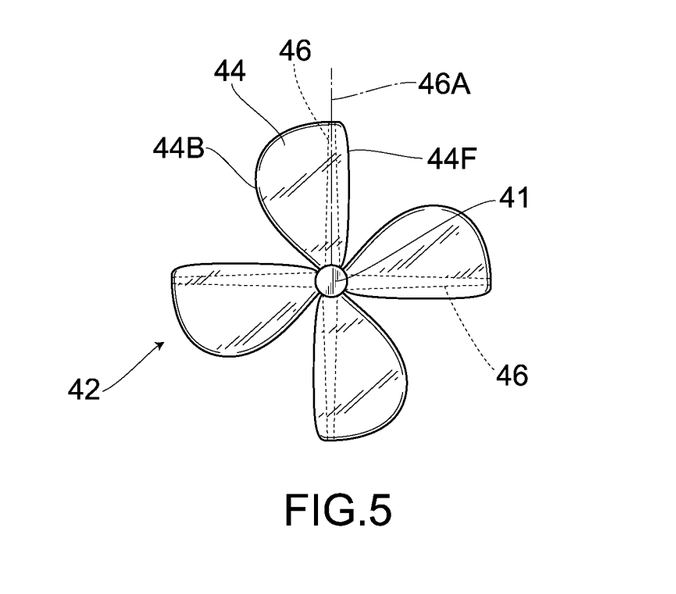
FIG. 5 is a side view of the horizontal axis wind turbine generator illustrating the embodiment 1 of the present invention.

A horizontal axis wind turbine generator 2 comprises a second rotating shaft 41 horizontally provided on an upper portion of a second windmill support post 42. A horizontal second rotating shaft 41 is provided at the upper end of the second windmill support post 42 via a supporting member 43. One side, e.g., on the leeward side, of the second rotating shaft 41 is provided with a second blade 44 while the other side, e.g., on the windward side, of the second rotating shaft 41 is mounted with a second generator 45.

The second blade 44 is provided on the second rotating shaft 41 via a second arm 46 called a main frame or the like. The second arms 46 are fixed at regular intervals radially in four directions so as to be orthogonal to a second rotating central axis line 47 of the second rotating shaft 41. The second blade 44 itself, which is covered with a metallic plate or the like and is hollow, is arranged in the longitudinal direction of the second arm 46. Besides, the second blade 44 itself is provided pivotally in relation to a central axis line 46A directed in the longitudinal direction of the second arm 46. A leading edge 44F acting as the windward side of the second blade 44, that is, the leading edge 44F that is an edge in the rotating direction of the second blade 44 protrudes somewhat more anteriorly than the second arm 46. Further, a trailing edge 44B of the second blade 44 protrudes backward longer than does forward the leading edge 44F thereof. Then, the cross section of the second blade 44 is formed in a streamline shape so that the leading edge 44F becomes thicker than the trailing edge 44B.

Figure 6:
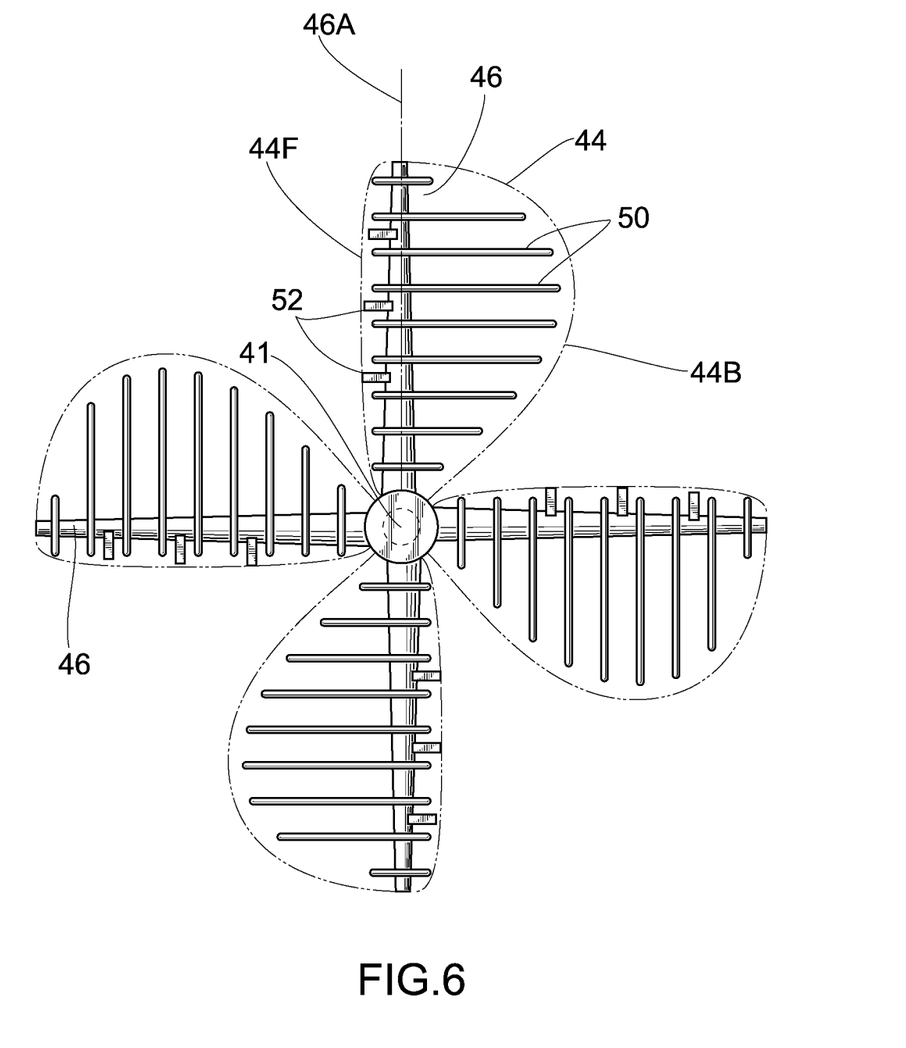
FIG. 6 is a schematic side view illustrating an arrangement of a spring of a blade main body in a main part of the horizontal axis wind turbine generator in the embodiment 1 of the present invention.
Figure 7:
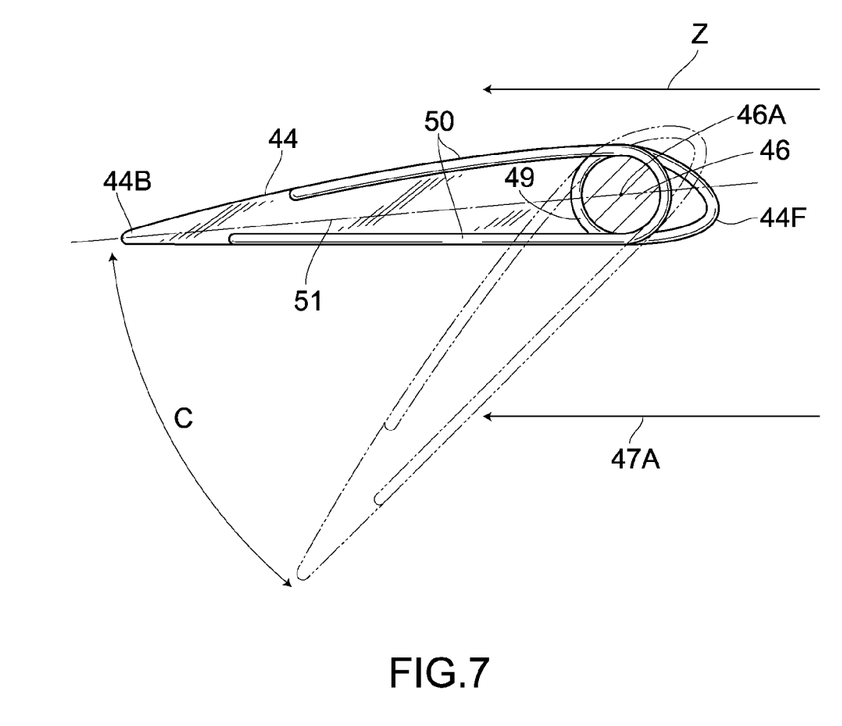
FIG. 7 is a schematic cross-sectional view illustrating an arrangement of a spring of a blade main body in a main part of the horizontal axis wind turbine generator in the embodiment 1 of the present invention.

Between the second arm 46 and the second blade 44, there is provided a torsional type spring in which on both sides of a coil spring 49 extending portions 50 protrude in the tangential direction of the coil spring 49. This coil spring 49 energizes the second blade 44 so that the blade central line 51 connecting the leading edge 44F and the trailing edge 44B intersects with a parallel line in parallel to the second rotating central axis line 47. Therefore, when a high wind blows at the time of a typhoon or the like, the blade 44 can turn against the force of the coil spring 49 so that the blade central line 51 can become parallel to the parallel line 47A in parallel to the second rotating central axis line 47. In the present embodiment, an appropriate portion of the coil spring 49 wound around the second arm 46 is fixed to the second arm 46 by bonding via a fixing portion 50. Thus, the extending portions formed in a leaf spring are coupled to the second blade 44. Then, at the time of dead calm, an intersecting angle C made by the blade central line 51 and the parallel line in parallel to the second rotating central axis line 47 is set at substantially 45 degrees. In addition, reinforcing ribs 52 are arranged between the leading edge 44F and the second arm 46 in the second blade 44.

Next is a description of the behavior of the foregoing structure. When generating electric power by the vertical axis wind turbine generator 1, at a dead calm, no wind pressure acts on the right-and-left pair of the first and second divided blade plates 12, 13 and the first and second coil springs 21, 22 are not energized. Accordingly, the right-and-left pair of the first and second divided blade plates 12, 13 are locked by the stopper 24, so that a first angle A between the first divided blade plate 13 and the upper supporting member 18, and a second angle B between the second divided blade plate 12 and the upper supporting member 18 are both maximized.

When the wind of a wind direction Z blows from the windward side, in a condition where the rear opening of the right-and-left pair of the first and second divided blade plates 12, 13 are opposed to the wind direction Z (a condition indicated by (1) in FIG. 1), the inner surfaces of the right-and-left pair of the first and second divided blade plates 12, 13 are subjected to wind pressure. Then, the wind pressure presses the right-and-left pair of the first and second divided blade plates 12, 13 and the torque thus generated in the right-and-left pair of the first and second divided blade plates 12, 13 is transmitted to the first rotating shaft 8 via the first arm 14.

When the right-and-left pair of the first and second divided blade plates 12, 13 transfers to the leeward side in association with the further rotation of the rotating shaft (a condition indicated by (2) in FIG. 1), the wind pressure presses against the outer surface of the first divided van plate 13 in the first rotating shaft 8 among the right-and-left pair of the first and second divided blade plates 12, 13, so that the first divided van plate 13 turns against the force of coil spring 21 with the front edge 12A defined as a rotating center to approach the first upper support members 18 in the first upper arm 15, the first intermediary arm 16 and the lower first arm 17. As a result, the first coil spring 21 is compressed for the first divided blade plate 13 to become substantially orthogonal to the longitudinal directions of the first upper arm 15, the first intermediary arm 16 and the first lower arm 17, causing no torque to be generated even if wind pressure works on the first divided blade plate 13 or generating low torque even if generated in that state.

At the same time, in the second divided van plate 12 located in the leeward side, the inner surface of the second divided blade plate 12 is subjected to the wind pressure. In this state, the second coil spring 22 is stretched for the second divided blade plate 12 to be positioned slantwise to the longitudinal direction of the first upper arm 15, the first intermediary arm 16 and the first lower arm 17. Therefore, part of the wind pressure that works on the inner surface of the second divided blade plate 12 is converted into torque and this torque is transmitted to the first rotating shaft 8 via the first upper arm 15, the first intermediary arm 16 and the first lower arm 17.

Then, when in association with the furthermore rotation of the first rotating shaft 8, the rear opening in the right-and-left pair of the first and second divided blade plates 12, 13 is arranged at a position where the rear opening faces the leeward side (a condition indicated by (3) in FIG. 1), the front edges 12A, 13A of the right-and-left pair of the first and second divided blade plates 12, 13 comes to face the windward side. Accordingly, the wind pressure works on the outer surfaces of the first and second divided blade plates 12, 13, so that the angles A, B of the first and second divided blade plates 12, 13 get small against the forces of the first and second coil springs 21, 22, reducing the wind resistance.

Further, when in association with the moreover rotation of the first rotating shaft 8, the right-and-left pair of the first and second divided blade plates 12, 13 is arranged on the windward side, the wind pressure works on the outer surface of the second divided blade plate 12, so that against the force of the second coil spring 22, the first divided blade plate 12 is pressed to the side of the first rotating shaft 8 and at the same time the wind pressure works on the inner surface of the first divided blade plate 13. The inner surface of the first divided blade plate 13 is positioned slantwise to the wind direction Z to thereby generate torque, transmitting the torque to the first rotating shaft 8 via the first upper arm 15, the first intermediary arm 16 and the first lower arm 17.

Then, the torque of the first rotating shaft 8 is transmitted to the speed increasing gear 25 coupled to the first rotating shaft 8, and the teeth 26 of the speed increasing disc gear 25 and the teeth of the driven gear 31 engage with each other to enable the generators 28, 29, 30 to operate. In addition, the torque of the first rotating shaft 8 can be transmitted not only directly to the speed increasing disc gear 25 but part of the torque can be transmitted from the first rotating shaft 8 to the speed increasing disc gear 25 via the coupling member 27.

In the horizontal axis wind turbine generator 2, at a dead calm, the blade central line 51 is arranged slantwise to the wind direction Z by elastically energizing force of the coil spring 49. When wind blows, the wind pressure works on the second blade 44 opposed to the wind direction Z to generate torque in the second blade 44 and this torque is transmitted to the second rotating shaft 41 via the second arm 46 to actuate the generator 45, thereby generating electric power. At this time, the wind pressure to the second blade 44 gets larger when wind gets higher and as a result, against the force of the coil spring 49, the angel between the blade central line 51 and the wind direction Z gets smaller, so that the wind pressure acting on the second blade 49 gets lower, thus enabling the rotation speed of the second rotating shaft 41 to maintain in stability.

When high wind blows, the blade central line 51 and the wind direction Z become substantially parallel to each other to reduce the wind pressure applied to the second blade 44, thus permitting the load applied to the blade 44 and the rotation speed of the second rotating shaft 41 to be prevented from being abruptly increased.

As described above, in the foregoing embodiment, the vertical axis wind turbine generator 1 includes the first rotating shaft 8 whose first rotating central axis line 9 is vertically directed, the first upper, first second intermediary and first third lower arms 15, 16, and 17 whose proximal end 15A is coupled to the side of the first rotating shat 8 and whose front edge 15B is provided laterally to the first rotating central axis line 9, the first blade 11 which is mounted on these upper, intermediary and lower arms 15, 16, and 17 and whose longitudinal direction is provided substantially in parallel to the first rotating central axis line 9, and the generators 28, 29, 30 coupled to the rotating shaft 8 via the speed increasing gear 15. Then, in the first blade 11, the right-and-left pair of the first and second divided blade plates 12, 13 is arranged in an substantially V-shaped form along the longitudinal direction of the first upper, first intermediary and first lower arms 15, 16, and 17. Besides, in the first blade 11, one side, that is in one rotating direction X of the first upper, first intermediary and first lower arms 15, 16, and 17 when the first rotating central axis line 9 in the right-and-left pair of the first and second divided blade plates 12, 13 is defined as a rotating center, is pivotally coupled, while the opposite side to the rotating direction of the first upper, intermediary and lower arms 15, 16, and 17 when the first rotating axis line 9 in the right-and-left pair of the first and second divided blade plates 12, 13 is defined as a rotating center, is provided in a openable and closable manner. Then, the first and second coil springs 21, 22 are interposed between the divided blade plates 12, 13 and the first upper, first intermediary and first lower arms 15, 16, and 17. As a result, the right-and-left pair of the first and second divided blade plates 12, 13 opens and closes according to the wind direction Z and the wind pressure to thereby regulate the rotation speed with a simple structure, thus enabling stable electric power generation to be obtained.

Further, by winding the first coil springs 21 and the second coil springs 22 around the first upper, first intermediary and first lower arms 15, 16 and 17, the first coil spring 21 and the second coil spring 22 can be stably mounted. Besides, the first coil spring 21 and the second coil spring 22 can be compressed and stretched so as to be restricted along the first upper, first intermediary and first lower arms 15, 16, and 17 that regulate the opening and closing directions of the proximal portions 12B, 13B of the divided blade plates 12, 13, thus allowing the divided blade plates 12, 13 to unfailingly operate so as to make appropriate angles A, B according to wind pressure.

(Embodiment 2)

Hereunder is a description of a different embodiment. In addition, the same numeral symbols are used for parts the same as in the foregoing embodiment and the detailed description thereof is omitted.

Figure 8:
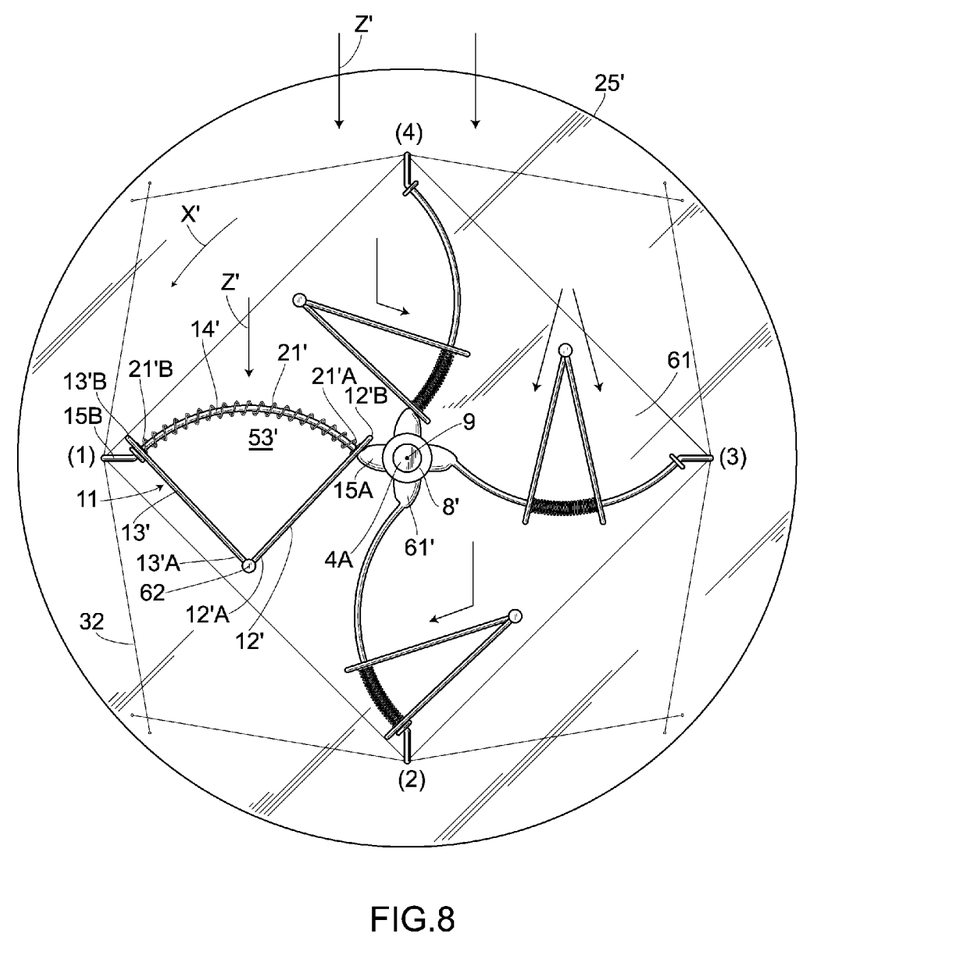
FIG. 8 is a plane view of the vertical axis wind turbine generator illustrating an embodiment 2 of the present invention.

FIG. 8 shows the embodiment 2. In the embodiment 2, a first rotating shaft 8' stands at the center of a rotating plate 61 that is rectangular in plane and is fixed to an upper surface of a speed increasing disc gear 25'. An intermediary portion in the longitudinal direction of a first arm 14' provided radially from the first rotating shaft 8' is provided in a circular-arch shaped manner so as to recede to a reverse direction to one rotating direction X'. The proximal portions 12'B, 13'B of divided blade plates 12', 13' are slidably provided on the first arm 14'. One end 21'A of a coil spring 21' wound around the first arm 14' is coupled to the divided blade plate 12', while the other end 21'B is coupled to the divided blade plate 13'. Front edges 12'A, 13'A of the right-and-left pair of the divided blade plate 12', 13' are pivotally coupled to the support member 62 standing on the rotating plate 61. The support member 62 is arranged at the center of the curvature radius of the first arm 14' so as to be opposed to the intermediary portion in the longitudinal direction of the first arm 14' provided in a circular-arch shaped manner.

Accordingly, when a rear opening of the divided blade plate 12', 13' is opposed to a windward direction Z' (a condition (1) in FIG. 8), wind pressure works on the inner surfaces of the divided blade plates 12', 13'. Therefore, the coil spring 21' stretches to open the rear opening of the divided blade plates 12', 13', thus generating the torque of the first rotating shaft 8' by the wind pressure.

When the rotating disc 61 further rotates and thereby the rear opening of the divided blade plates 12', 13' comes to intersect with the wind direction Z', as shown in a state (2) in FIG. 8, the first divided blade plate 12' is pressed by the wind pressure and then the coil spring 21' is compressed for the rear opening to close. In this case, the outer surface of the first divided blade plate 12' is subjected to the wind pressure, thereby generating the torque of the rotating shaft 8'.

When the rotating disc 61 furthermore rotates and thereby the front edges 12'A, 13'A of the divided blade plates 12', 13', as shown in a state (3) FIG. 8, come to face the wind direction Z', both the outer surfaces of the divided blade plates 12', 13' are pressed by the wind pressure to compress the coil spring 21' and then close the rear opening, permitting the air resistance against the divided blade plates 12', 13' to be reduced as much as possible.

Then, when the rotating disc 61 moreover rotates and thereby the rear opening of the second divided blade plate 12', 13' comes to intersect with the wind direction Z', as shown in a condition (4) in FIG. 8, the second divided blade plate 13' is pressed by the wind pressure to compress the coil spring 21' and close the rear opening. In this case, the outer surface of the second divided blade plate 13' is subjected to the wind pressure, thereby generating the torque of the rotating shaft 8'.

In this manner, the proximal portions 12'B, 13'B of the divided blade plates 12', 13' whose front edges 12'A, 13'A are pivotally coupled together are provided slidably along the first arm 14' and the coil spring 21' is interposed between these divided blade plates 12', 13'. As a result, the right-and-left pair of the divided blade plates 12', 13' opens and closes according to the wind direction Z' and the wind pressure, enabling a stable electric power generation to be obtained by regulating the rotation speed of the rotating shaft 8' with a simple structure.

(Embodiment 3)

Figure 9:
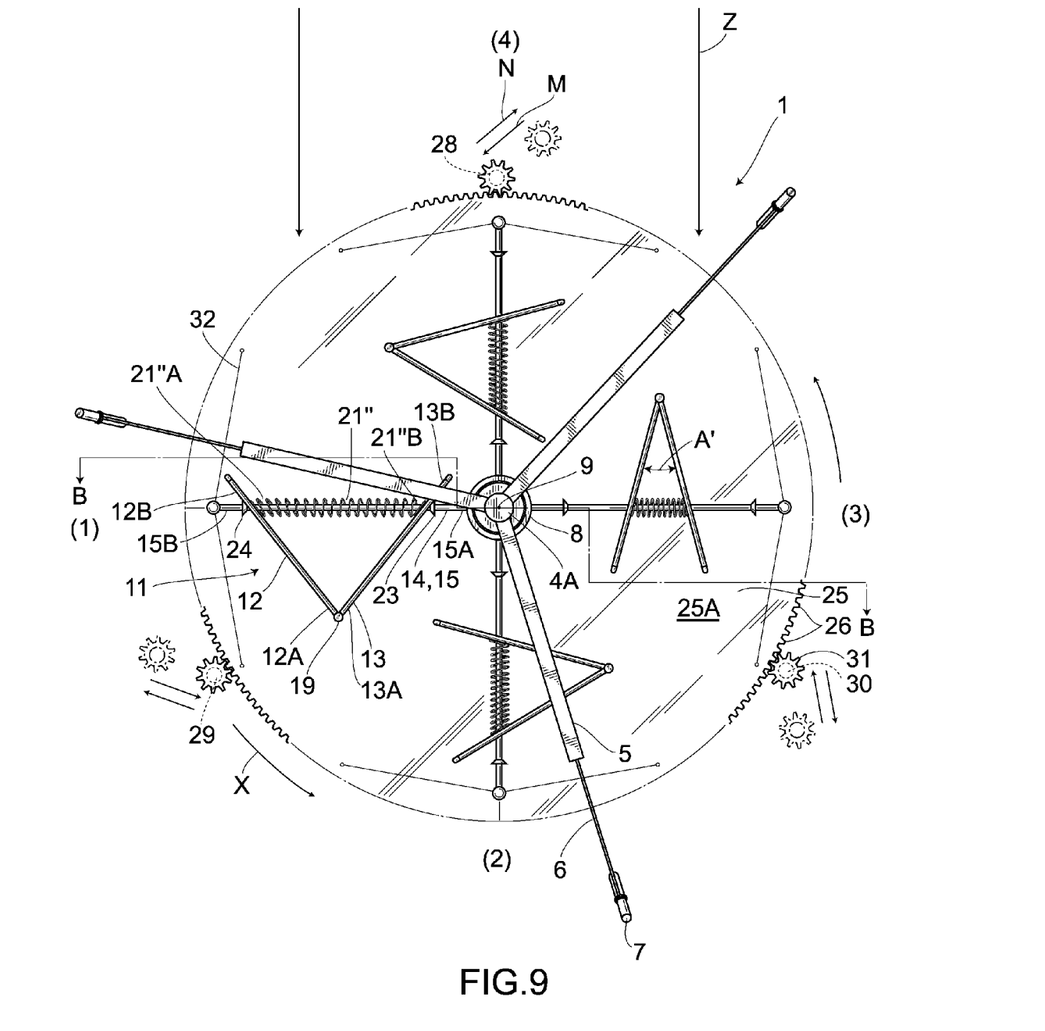
FIG. 9 is a plane view of the vertical axis wind turbine generator illustrating an embodiment 3 of the present invention.
Figure 10:
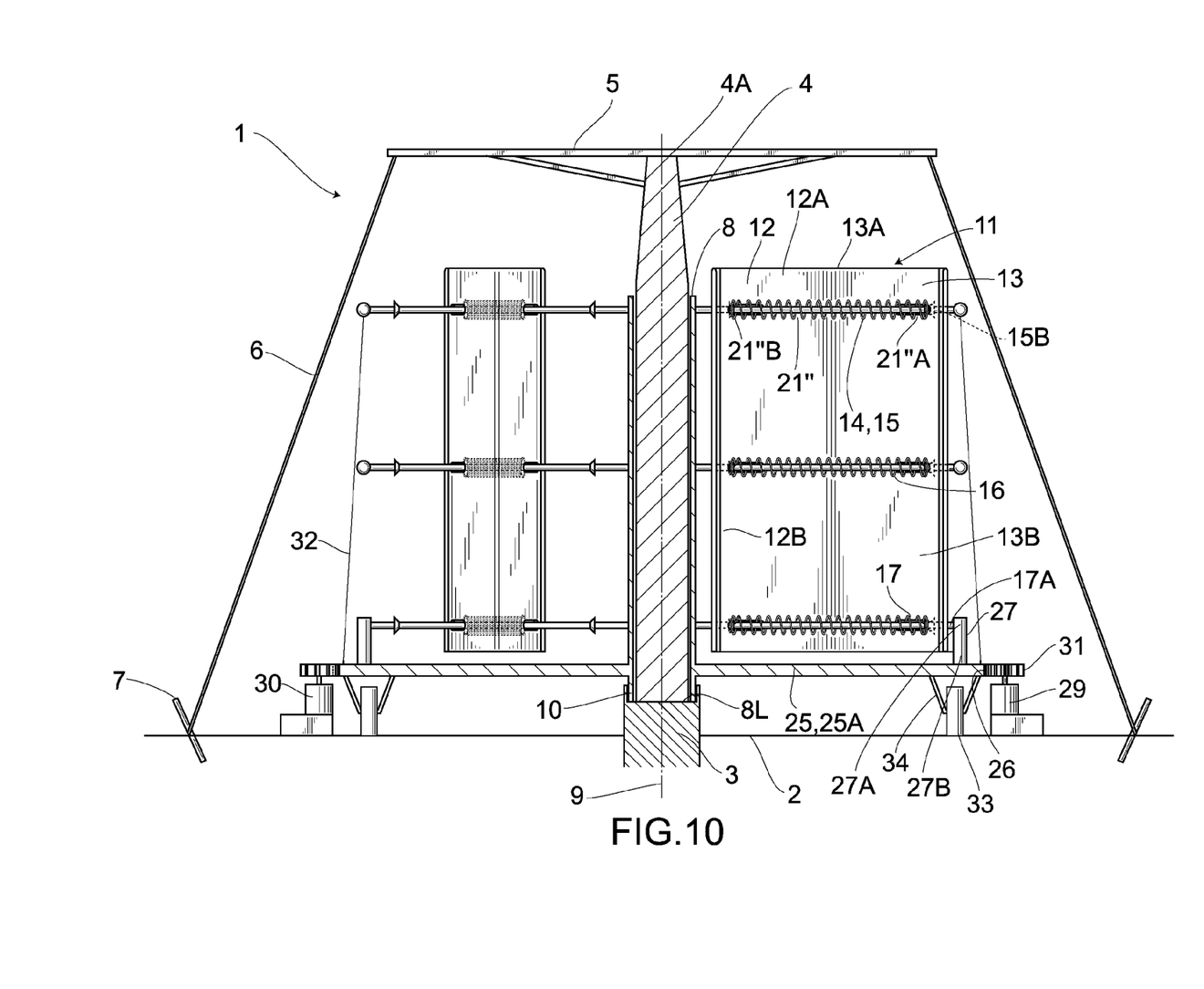
FIG. 10 is a longitudinal cross-sectional view of the vertical axis wind turbine generator in a cross-section on a B-B line in FIG. 9 illustrating the embodiment 2 of the present invention.
Figure 11:
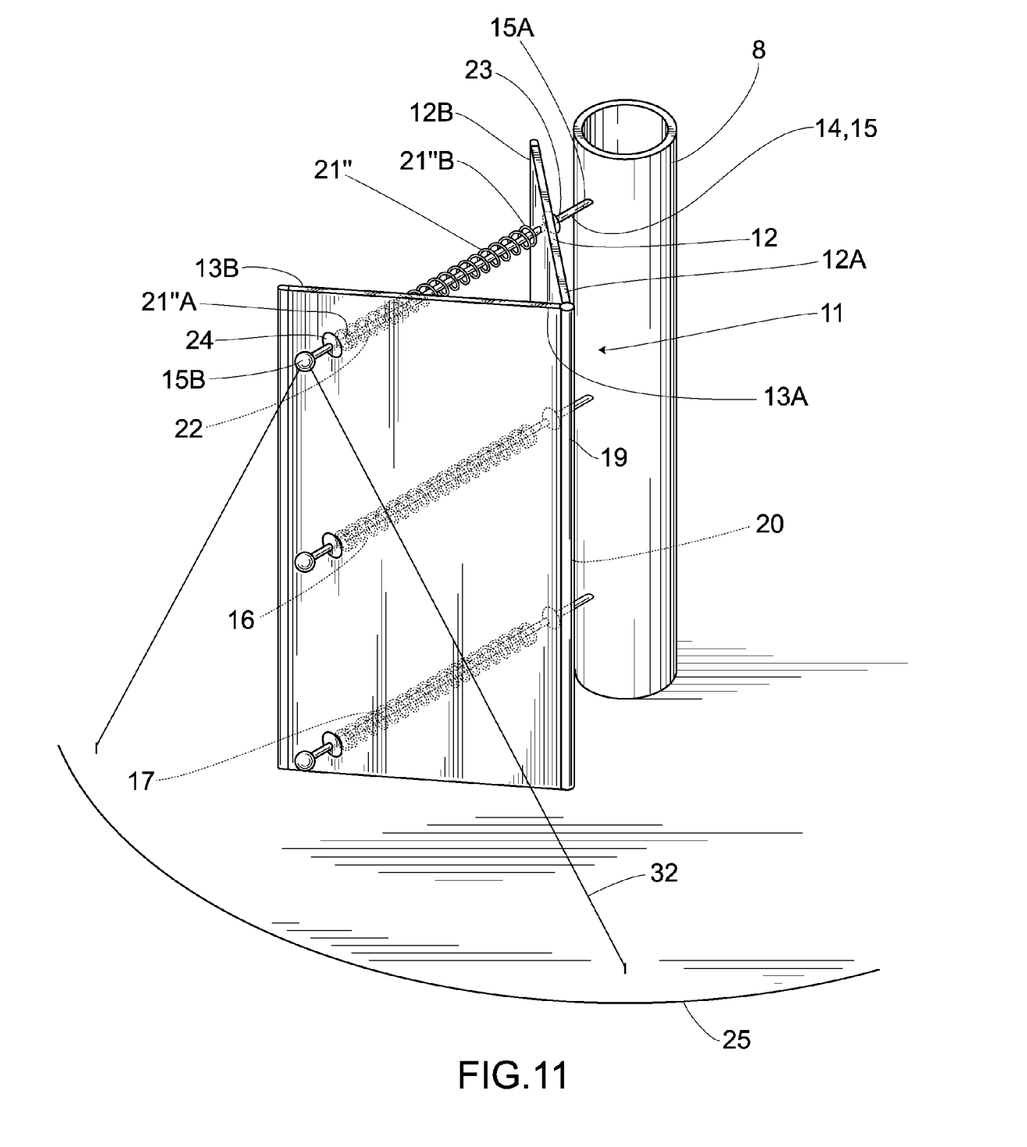
FIG. 11 is a perspective view of a main part of the vertical axis wind turbine generator illustrating the embodiment 3 of the present invention.

FIGS. 9 to 11 show an embodiment 3. The generator according to the embodiment 3 eliminates the support member 18 employed in the embodiment 1 to pivotally couple the front edges 12A, 13A of the divided blade plates 12, 13 only via the turnable coupling means 19. Then, one end 21"A and the other end 21"B of the coil spring 21" wound around the arm 15 are coupled to the divided blade plates 12, 13, respectively.

Accordingly, as is the case with the embodiment 1, when wind in the wind direction Z blows from the windward side, the rear opening of the right-and-left pair of the divided blade plates 12, 13 comes to be opposed to the wind direction Z (a position indicated by (1) in FIG. 9), the inner surfaces of the right-and-left pair of the divided blade plates 12, 13 are subjected to the wind pressure and the divided blade plates 12, 13 is pressed by the wind pressure. As a result, the torque generated in the right-and-left pair of the divided blade plates 12, 13 is transmitted to the first rotating shaft 8 via the first arm 14.

Further, when the rear opening of the right-and-left pair of the divided blade plates 12, 13 comes to a position opposed to the leeward side in association with the further rotation of the first rotating shaft 8 (a condition indicated by (3) in FIG. 9), the front edges 12A, 13A of the right-and-left pair of the divided blade plates 12, 13 are allowed to face the windward side. Accordingly, the wind pressure works on the outer surfaces of the first and second divided blade plates 12, 13 and thereby the angle A' between the first and second divided blade plates 12, 13 gets small against the force of the spring 21" for the wind resistance against the divided blade plates 12, 13 to be reduced.

Consequently, the blade 11 is allowed to stably operate according to a wind force with a simple structure.

(Embodiment 4)

Figure 12:
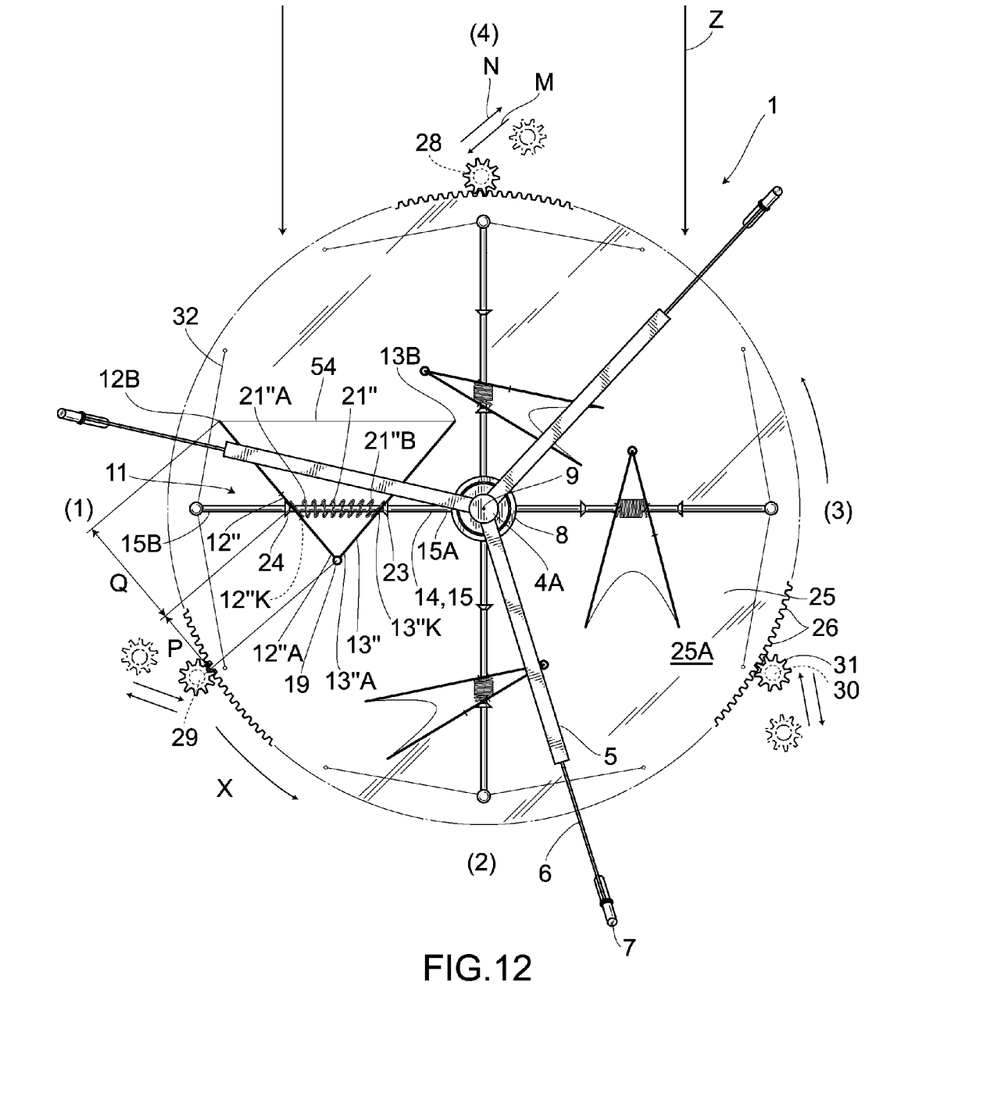
FIG. 12 is a plane view of the vertical axis wind turbine generator illustrating an embodiment 4 of the present invention.

FIG. 12 shows a fourth embodiment. As with the third embodiment, with the support member 18 eliminated, the front edges 12"A, 13"A of the divided blade plates 12", 13" are coupled only via the turnable coupling means 19 and one end 21"A and the other end 21"B of a coil spring 21" wound around the arm 15 are linked to the divided blade plates 13", 12", respectively.

Then, the first and second divided blade plates 12", 13" are formed from a spring plate material made of spring steel. A symbol 12"K indicates a penetrated portion which is formed in the upper portion of the first divided blade plates 12" and is used for the first arm 14 (first upper arm 15). This penetrated portion is formed horizontally long from a front edge 12A" to a proximal end 12"B and therefore in planar view, the first and second divided blade plates 12", 13" are allowed to slide, in relation to the first arm 25, perpendicularly to the longitudinal direction of the first upper arm 15. Besides, a symbol 13"K indicates a penetrated portion which is formed in the second divided blade plate 13" and is used for the first arm 14 (first upper arm 15). This penetrated portion is formed in substantially the same shape as the cross-section of the first upper arm 15 and therefore the first divided blade plate 12" is allowed to be slidable in relation to the first upper arm 15 and the second divided blade plate 13" is allowed to be stationary to the first upper arm 15. In addition, the same penetrated portion is provided also in the first and second divided blade plates 12", 13", and the penetrated portion like this is provided in the blades of the other embodiments.

As compared with a length P in planar view between the center in the longitudinal direction of the penetrated portion 12"K and the front edge 12"A which are in the first divided blade plate 12", a length Q in planar view between the center of the longitudinal direction of the penetrated portion 12"K and the front end 12B is formed longer than P (P<Q). The same goes for the second divided blade plates 13".

Further, both ends of a flexible wire, e.g., a wire rope 54 are connected with the proximal end 12"B of the first divided blade plate 12" and the proximal end 13B of the first divided blade plate 13" to regulate a maximum opening angle formed between the first divided blade plate 12" and the second divided blade plate 13", preventing the damage of the first and second divided blade plates 12", 13" caused by wind force. In addition when the wire rope 54 is not strained, the wire rope 54 is slackened. In addition, it is acceptable that the penetrated portion 12"K is formed in the same shape as the cross-section of the first upper arm 15 and the penetrated portion 13"K is formed horizontally long.

Accordingly, as with the embodiments 1, 3, when wind in the wind direction Z blows from a windward side and the rear opening of a right-and-left pair of the first and second divided blade plates 12", 13" is opposed to the wind direction Z (a position indicated by (1) in FIG. 12), the inner surfaces of the right-and-left pair of the divided blade plates 12", 13" are subjected to the wind pressure to be pressed thereby. As a result, the torque generated by the right-and-left pair of the divided blade plates 12", 13" is transmitted to the first rotating shaft 8 via the first arm 14. Further, when the rear opening of the right-and-left pair of the divided blade plates 12", 13" comes to a position opposed to the leeward side in association with the rotation of the first rotating shaft 8 (a state indicated by (3) in FIG. 12), the front edges 12"A, 13"A of the right-and-left pair of the divided blade plates 12", 13" are allowed to face the windward side. Accordingly, the wind pressure works on the outer surfaces of the first and second divided blade plates 12", 13" and thereby the angle between the first and second divided blade plates 12", 13" gets small against the force of the spring 21" for the wind resistance against the divided blade plates 12", 13" to be reduced.

Then, the first and second divided blade plates 12", 13" are made of a spring material, so that the first and second divided blade plates 12", 13" themselves easily can deform according to wind pressure.

Further, as compared with the length P in planar view between the center in the longitudinal direction of the penetrated portion 12"K and the front edge 12"A which are in the first divided blade plate 12", the length Q in planar view between the center of the longitudinal direction of the penetrated portion 12"K and the front end 12"B is formed longer than the length P (P<Q). Hence, the blade plate portion on the length Q side comes nearer to the windward side and a portion between the first and second divided blade plates 12", 13" can be efficiently subjected to wind.

Furthermore, the first and second divided blade plates 12", 13" are made of a spring plate material and therefore the first and second divided blade plates 12", 13" can become largely deformed. Moreover, the flexible wire, e.g., the wire rope 54 is connected with the proximal ends 12"B, 13"B to enable the maximum opening angle of the first and second divided blade plates 12", 13" to be confined, permitting the first and second divided blade plates 12", 13" to be prevented from being subjected to damage such as breaking.

(Embodiment 5)

Figure 13:
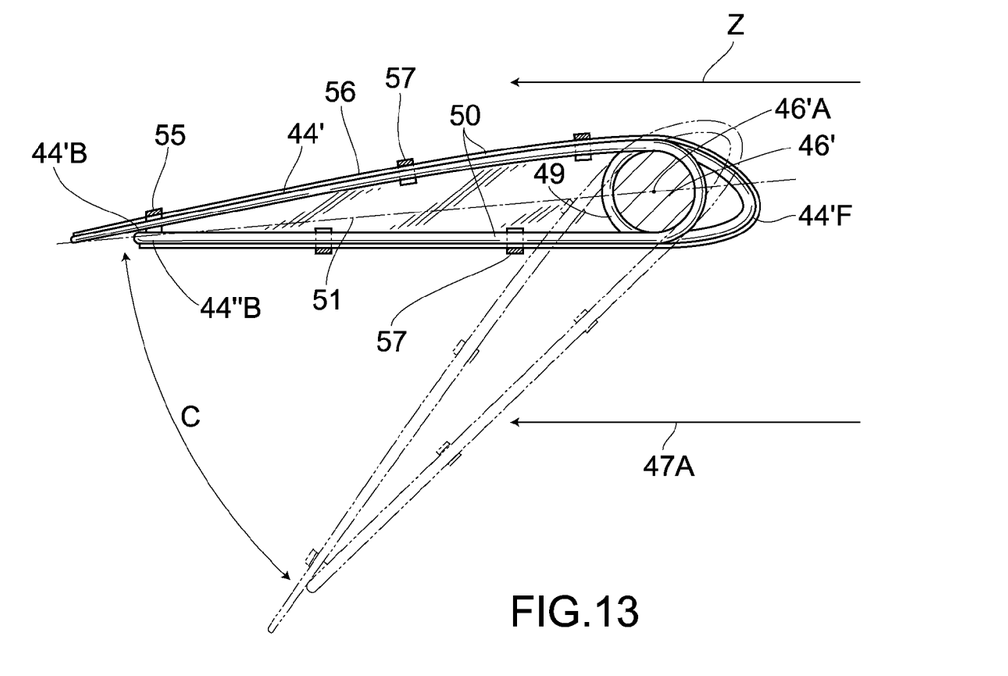
FIG. 13 is a schematic cross-sectional view of the vertical axis wind turbine generator illustrating an embodiment 5 of the present invention.

FIG. 13 shows a fifth embodiment. In a second blade 44', trailing edges 44'B, 44'B of upper and lower two-tiered extension portions 50 are provided slidably to each other. Therefore, a frame-shaped first slide receiving piece 55 protruding upward is coupled to the lower trailing edge 44"B by bonding, while the upper trailing edge 44'B is inserted slidably into a hole formed in the first slide receiving portion 55. In addition, a lubricating oil (not shown) lies between the first slide receiving portion 55 and the upper trailing edge 44'B.

Further, in the second blade 44', in order to couple the two-tiered upper and lower two-tiered extension portions 50, the trailing edge 44'F and a blade surface member 56 for covering these extension portions 50, together, each of the upward and downward second slide receiving pieces 57 are attached to each of the upper and lower two-tiered extension portions 50 by bonding. Besides, the blade surface member 56 is inserted slidably into the hole of the second slide receiving piece 57. In addition, the lubricating oil (not shown) lies between the second slide receiving piece 57 and the blade surface member 56.

Accordingly, in the fifth embodiment, when subjected to wind, the upper and lower two-tiered extension portions 50 of the second blade 44' becomes deformed. In this case, the upper trailing edge 44'B is inserted slidably into the hole formed in the first slide receiving piece 55 via the lubricating oil and further the blade surface member 56 is inserted slidably into the hole formed in the second slide receiving piece 55 via the lubricating oil. Hence, the second blade 44' can become slidably deformed according to wind pressure. As a result of this deformation, wind pressure can be efficiently received to be converted into torque.

Industrial Availability

As described above, the vertical axis wind turbine generator according to the present invention is applicable to a variety of applications. A generator, e.g., may be coupled directly to the shaft of the generator.

What is claimed is:

1. A vertical axis wind turbine generator comprising:
   a rotating shaft with a rotating central axis line thereof vertically directed, said rotating shaft including arms;
   blades provided on the arms substantially in parallel to a direction of said rotating central axis line; and
   a generator operating in conjunction with said rotating shaft,
   wherein said blades comprise blade plates arranged in a V-shaped formation in an openable and closable manner, said blade plates being provided with springs, said springs being provided between said blade plates along said arms.

2. The vertical axis wind turbine generator according to claim 1, wherein a front edge of said blade plate faces toward a rotating direction of said rotating shaft.

3. The vertical axis wind turbine generator according to claim 1, wherein said blade plate is formed from a spring plate material, and a flexible wire is connected between proximal portions of said blade plates for regulating a maximum opening degree.

4. The vertical axis wind turbine generator according to claim 1, wherein said blade plate is provided slidably along said arm.

5. The vertical axis wind turbine generator according to claim 1, wherein said arms are provided radially from said rotating shaft.

6. The vertical axis wind turbine generator according to claim 1, wherein said spring is a coil spring and is wound around said arm.

\* \* \* \* \*